United States Patent [19]

Chu et al.

[11] Patent Number: 5,093,301

[45] Date of Patent: * Mar. 3, 1992

[54] CATALYST AND METHOD FOR ITS MANUFACTURE

[75] Inventors: Wing F. Chu, Leimen; Franz-Josef Rohr, Absteinach; Norbert Pfeifer, Sandhausen, all of Fed. Rep. of Germany

[73] Assignee: Asea Brown Boveri Aktiengesellschaft, Mannheim, Fed. Rep. of Germany

[ * ] Notice: The portion of the term of this patent subsequent to Oct. 8, 2008 has been disclaimed.

[21] Appl. No.: 424,201

[22] PCT Filed: Dec. 8, 1988

[86] PCT No.: PCT/EP88/01125

§ 371 Date: Oct. 10, 1989

§ 102(e) Date: Oct. 10, 1989

[87] PCT Pub. No.: WO89/05186

PCT Pub. Date: Jun. 15, 1989

[30] Foreign Application Priority Data

Dec. 10, 1987 [DE] Fed. Rep. of Germany ....... 3741888

[51] Int. Cl.[5] .................... B01J 23/10; B01J 23/72; B01J 23/78

[52] U.S. Cl. .................. 502/303; 502/524; 502/525

[58] Field of Search ............... 502/303, 524, 525

[56] References Cited

U.S. PATENT DOCUMENTS

| | | | |
|---|---|---|---|
| 3,900,428 | 8/1975 | Mai et al. ............ | 502/525 X |
| 3,929,670 | 12/1975 | Kudo et al. .......... | 502/303 X |
| 4,055,513 | 10/1977 | Wheelock ........... | 502/524 X |
| 4,485,191 | 11/1984 | Sekido et al. ........ | 502/525 X |
| 4,820,678 | 4/1989 | Xu ...................... | 502/524 X |

*Primary Examiner*—W. J. Shine
*Attorney, Agent, or Firm*—Herbert L. Lerner; Laurence A. Greenberg

[57] ABSTRACT

A catalyst for the elimination of toxic substances in exhaust gases from combustion systems and internal combustion engines, having at least one layer of catalyst material, includes a catalyst material formed by at least one mixed oxide system, which has unsaturated ions on its surface that effect charge transfer processes. A method for manufacturing such a catalyst includes grinding dry carbonates or oxides of lanthanum, manganese, iron, copper and strontium in a defined ratio by weight for at least one hour, and sintering the powder mixture thus formed at 1300° C. for forming the perovskite structure or the perovskite and spinel structure.

3 Claims, 1 Drawing Sheet

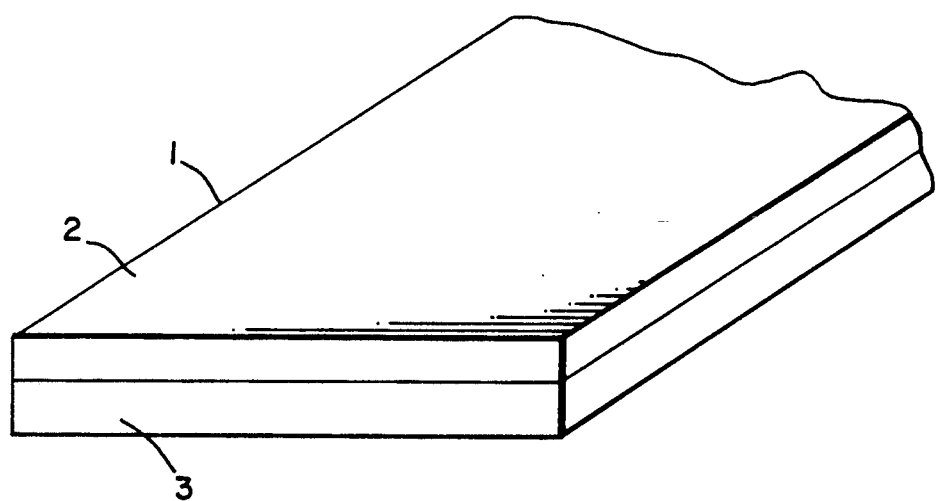

CATALYST AND METHOD FOR ITS MANUFACTURE

The invention relates to a catalyst for the elimination of toxic substances in exhaust gases from combustion systems and internal combustion engines, having at least one layer of catalyst material.

Such catalysts are preferably used to eliminate toxic substances in exhaust gases. For eliminating nitrogen oxides in flue gases, the SCR method (selective catalytic reduction) is preferably used.

In this method, the nitrogen oxides ($NO_x$) are reduced by means of the ammonia ($NH_3$) admixed with the flue gas in a catalyst of titanium oxide and vanadium oxide ($TiO_2/V_2O_3$) at 300° to 400° C., forming harmless nitrogen and water. A disadvantage of the catalysts used in the SCR method is that they are unsuitable for reducing agents contained in fuel or exhaust gas, such as carbon monoxide, hydrogen or hydrocarbons, and in practical use have only a very short service life. These disadvantages, as well as the necessity of using ammonia as a reducing agent, limit the technical practicability of the SCR method considerably. Additional difficulties arise in the storage of the ammonia, as well as in dispensing it accurately. Moreover, the formation of solid ammonium sulfide residues limits the practicability of this method.

It is therefore the object of the invention to devise a catalyst that enables the reduction of nitrogen oxides using carbon monoxide, hydrogen and hydrocarbons as well as ammonia, and to disclose a method with which such a catalyst can be manufactured.

The first part of this object is attained by a catalyst material formed by at least one mixed oxide system, which has unsaturated ions on its surface that effect charge transfer processes.

A method for the manufacture of such a catalyst comprises grinding dry carbonates or oxides of lanthanum, manganese, iron, cooper and strontium in a defined ratio by weight for at least one hour, and sintering the powder mixture thus formed at 1300° C. for forming the perovskite structure or the perovskite and spinel structure.

The catalyst according to the invention is distinguished by a long service life, which can be ascribed to its thermal, chemical and mechanical stability. With it, nitrogen oxides can be reduced with the aid of carbon monoxide, hydrogen and hydrocarbons, which are contained in every exhaust gas from internal combustion engines and combustion systems. Reduction by the additional use of ammonia is also possible with this catalyst. The pore size of the catalyst material is selected such that overly large pores do not reduce the active surface area. Nor are the pores too small, so the diffusion of the chemical reactants into the catalyst and the diffusion of the reaction products out of it is not hindered.

Further characteristics essential to the invention are defined by the dependent claims.

The mixed oxides of perovskite structure, or perovskite spinel structure, used for manufacturing the catalyst are distinguished, over a wide temperature range, between room temperature and a temperature of 1200° C., by high thermal stability and chemical resistance to hot gases, which entrain with them components in the form of corrosive substances, such as oxygen, sulfur, sulfur oxides, sulfates, vanates, and various alkali salts.

The catalytic activity of these mixed oxides, especially in the reduction of nitrogen oxides by means of carbon monoxide, hydrogen, hydrocarbons or ammonia, is based on the action of the d-electron orbitals of the transition metal ions that are contained in each of these mixed oxides and are preferably located on the surface of the completed catalyst. In the cubic perovskite lattice of the aforementioned mixed oxides, the ions of the transition metals and the oxygen ions are located on the 100 face of the lattice. On the surface of these crystallites, the ions of the transition metals of these mixed oxides are unsaturated, because of the lack of oxygen ions. These unsaturated ions effect charge transfer processes with adsorbed molecules from the gas phase. As a result, the reduction of nitrogen oxides is effected in the presence of suitable reducing agents such as carbon monoxide, hydrogen and hydrocarbons and ammonia.

Mixed oxides of spinel structure also contain ions of the transition metals on the crystal surface. The catalytic activity of the pure spinels is lower by comparison with the mixed oxides of pure perovskite structure. By suitable combination of mixed oxides of perovskite structure and those of spinel structure, the catalytic activity of these mixed oxides for the reduction of the nitrogen oxides can be very markedly improved.

The manufacture of the catalyst according to the invention will now be described, referring to a drawing.

BRIEF DESCRIPTION OF THE DRAWING

The drawing is a fragmentary, diagrammatic, perspective view of a catalyst mounted on a substrate according to the invention.

The sole FIGURE pertaining to the description shows a catalyst 1. The actual catalyst material 2 is applied to a substrate 3. It is formed by a single- or multi-phase mixed oxide system. This mixed oxide system may for instance have a pure perovskite structure, or a mixed perovskite/spinel structure. The preferred mixed oxide systems have the following composition:

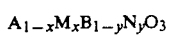
$$A_{1-x}M_xB_{1-y}N_yO_3$$

A mixed oxide system of perovskite/spinel structure having the composition:

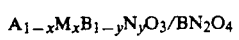
$$A_{1-x}M_xB_{1-y}N_yO_3/BN_2O_4$$

can also be used for manufacturing the catalyst. A mixed oxide system having the following composition:

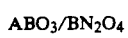
$$ABO_3/BN_2O_4$$

is also suitable as catalyst material. The mixed oxide also has a phase mixture of perovskite structure and spinel structure. In the above-shown general compositions of the mixed oxide systems, A represents lanthanum, M represents magnesium, calcium, strontium or barium, B stands for manganese, iron, cobalt, nickel and chromium, and N represents iron, manganese, copper or vanadium. In the above compositions, x can have a value between 0 and 0.6, while y can assume a value between 0 and 0.6. Specialized examples for the above-described general compositions of the possible mixed oxides are described below.

The first composition has a mixed oxide of pure perovskite structure:

$$La_{0.84}Sr_{0.16}Fe_{0.68}Cu_{0.32}O_3$$

The compositions shown below are examples of mixed oxides of perovskite and spinel structure:

$$La_{0.79}Sr_{0.21}Fe_{0.68}Cu_{0.32}O_3/FeMn_2O_4$$

or $$LaFe_{0.68}Cu_{0.32}O_3/FeFe_2O_4$$

Two further mixed oxides of perovskite and spinel structure are shown:

$$LaFeO_3/CuFe_2O_4$$

or $$LaFeO_3/MnFe_2O_4/CuFe_2O_4$$

To prepare these above-described compositions, carbonates or oxides of the metals that form the mixed oxides are used. For instance, lanthanum oxide ($La_2O_3$), strontium oxide (SrO), manganese oxide ($MnO_2$), iron oxide ($Fe_2O_3$) and copper oxide (CuO or $Cu_2O$) are mixed together in quantities such that the particular desired composition is obtained. The mixture of the aforementioned oxides is ground dry for at least an hour in a ball mill or vibration grinding mill. Next, the powder mixture is sintered for four hours at 1300° C., and by solid-state reactions, the desired mixed oxide formation of pure perovskite structure or of a perovskite/spinel structure is formed. To produce catalysts having the required large specific surface areas, the sintered cake is ground in a vibration grinding mill to a very fine-grained powder. The powder sought should have a grain size between 0.1 and 5 μm. The sintered cake, after being ground to the powder having the desired grain size, is processed to make a porous granulate having a diameter between 2 and 5 mm, or into porous honeycomb structures. To this end, the fine-grained powder has an organic binder added to it, and optionally a propellant or pore forming agent as well. All three conditions are met for instance by ammonium bicarbonate and/or polyethylene glycols. By compression or extrusion, a catalyst in the form of the porous granulate having the desired diameter, or in the form of the desired honeycomb structure, can be formed. By an ensuing thermal decomposition of the organic binder or propellant added, with a heat treatment in air and an ensuing sintering at 1000° to 1200° C., a catalyst material is manufactured that is distinguished by high mechanical, thermal and chemical stability.

To manufacture a catalyst 1, of the kind shown in the drawing, first a suspension of 50% by weight of the fine-grained powder is formed, the preparation of which is described above. Preferably a powder is used that has a grain size between 0.1 and 5 μm. To this powder, 7.5% by weight of ammonium carbonate or polyethylene glycols and 42.5% by weight of ethyl alcohol or isopropyl alcohol, which serves as a suspension agent, is added. The weight figures given refer to the total weight of the suspension. The quantity of propellant and pore forming agents is selected to be large enough that pores are formed in the catalyst material having a diameter of from 0.1 to 0.5 μm, and at least 30% of the pores formed have this size. In the catalyst 1 shown, the catalyst material 2 is applied to a ceramic substrate 3. The substrate 3 may be manufactured from fine-pored alpha aluminum oxide, cordierite, or mullite. Other ceramic materials that meet the conditions required may also be used to form the substrate. The substrate material must likewise have pores, the diameter of which is from 6 to 7 μm. At least 50% of the pores should have this diameter. Primarily, the ceramic material must meet the condition that it is readily compatible with the catalyst material 2. The catalyst material 2 may be applied to the surface of the substrate by immersion or spraying using the above-prepared suspension. By drying and heating in air, the suspension agent and the propellant or pore forming agent are thermally decomposed. The remaining residue is the fine-grained catalyst material 2. This material is sintered to the surface of the substrate 3 at 1200° C.

The use of a ceramic substrate is not absolutely necessary. It merely facilitates the securing of the catalyst 1 to other components (not shown here). At the same time, the substrate can protect the catalyst material against corrosion or can prevent incompatibility with materials of other components, because with it, direct contact is avoided.

It is also possible to apply the catalyst material to a foundation from which it can later be detached, so that the catalyst 1 is formed solely by the layer 2.

We claim:

1. A method for manufacturing a catalyst for the elimination of toxic substances in exhaust gases from combustion systems and internal combustion engines having at least one layer of catalyst material, which comprises drying and grinding lanthanum oxide ($La_2O_2$), strontium oxide (SrO), manganese oxide ($MnO_2$), iron oxide ($Fe_2O_3$) and/or copper oxide (CuO) in a ratio by weight such that a powder with the following compositions is obtained:

$$La_{0.84}Sr_{0.16}Fe_{0.68}Cu_{0.32}O_3$$

or $$La_{0.79}Sr_{0.21}Fe_{0.68}Cu_{0.32}O_3/FeMn_2O_4$$

or $$LaFe_{0.68}Cu_{0.32}O_3/FeFe_2O_4$$

or $$LaFeO_3/CuFe_2O_4$$

or $$LaFeO_3/MnFe_2O_4/CuFe_2O_4$$

with a grain size of 0.1 μm to 0.5 μm, sintering the powder for forming a perovskite structure or a perovskite and spinel structure, pressing or extruding the powder after the addition of ammonium bicarbonate and/or polyethylene glycols as propellants and pore forming agents, for forming granulates or honeycomb structures, then decomposing the propellants and pore forming agents by heating in air for forming a catalyst material, and subsequently sintering the catalyst material at 1000°–1200° C.

2. A catalyst for the elimination of toxic substances in exhaust gases from combustion systems and internal combustion engines, having at least one layer of catalyst material, which comprises forming the catalyst material of at least one mixed oxide system, having unsaturated ions on its surface that effect charge transfer processes and having the following composition:

$$La_{0.79}Sr_{0.21}Fe_{0.68}Cu_{0.32}O_3/FeMn_2O_4$$

or $$LaFe_{0.68}Cu_{0.32}O_3/FeFe_2O_4$$

or $$LaFeO_3/CuFe_2O_4$$

or $$LaFeO_3/MnFe_2O_4/CuFe_2O_4.$$

3. A method for manufacturing a catalyst for the elimination of toxic substances in exhaust gases from combustion systems and internal combustion engines having at least one layer of catalyst material, which comprises mixing together and grinding dry lanthanum oxide ($La_2O_2$), strontium oxide (SrO), manganese oxide ($MnO_2$), iron oxide ($Fe_2O_3$) and/or copper oxide (CuO) in a ratio by weight such that the following compositions are obtained:

$$La_{0.84}Sr_{0.16}Fe_{0.68}Cu_{0.32}O_3$$

or $$La_{0.79}Sr_{0.21}Fe_{0.68}Cu_{0.32}O_3/FeMn_2O_4$$

or $$LaFe_{0.68}Cu_{0.32}O_3/FeFe_2O_4$$

or $$LaFeO_3/CuFe_2O_4$$

or $$LaFeO_3/MnFe_2O_4/CuFe_2O_4,$$

and sintering the powder mixture at 1300° C. for forming a perovskite structure or a perovskite and spinel structure.

* * * * *